United States Patent

[11] 3,533,352

| [72] | Inventor | Leonidas C. Miller |
| | | 1321 Sombrero Drive, Monterey Park, California 91754 |
| [21] | Appl. No. | 746,989 |
| [22] | Filed | July 23, 1968 |
| [45] | Patented | Oct. 13, 1970 |

[54] APPARATUS FOR APPLYING HEAT AND PRESSURE
13 Claims, 5 Drawing Figs.

[52] U.S. Cl. .................................................. 100/93, 18/17, 18/19, 100/211, 156/311, 156/498, 156/583
[51] Int. Cl. ................................................ B30b 15/34
[50] Field of Search ....................................... 100/93, 211, 92; 156/580, 583, 282, 311, 498; 18/17(H), 17(P), 19(F); 161/(Heat & Cool Digest)

[56] References Cited
UNITED STATES PATENTS

| 1,872,693 | 8/1932 | Drake | 100/211X |
| 1,956,168 | 4/1934 | Fix et al. | 100/211X |
| 2,466,735 | 4/1949 | Piazze | 161/H&CUX |
| 2,494,281 | 1/1950 | Batchelor et al. | 100/211 |
| 2,509,439 | 5/1950 | Langer | 156/498 |
| 3,467,741 | 9/1969 | Itesling | 18/19X |

*Primary Examiner*—Peter Feldman
*Attorney*—Lyon and Lyon

ABSTRACT: Apparatus for applying heat and pressure to a work element, such as a printed circuit laminate, by means of high energy infrared heaters located within a pressure chamber. One wall of the chamber contacts the work element, and the infrared heaters are positioned to radiate heat against that wall. Fluid under pressure, such as air or an inert gas, pressurizes the chamber and also cools the heaters and the chamber walls, so that a rapid on-off cycle is achieved.

Patented Oct. 13, 1970

INVENTOR
LEONIDAS C. MILLER
BY
Lyon & Lyon
ATTORNEYS

INVENTOR
LEONIDAS C. MILLER
BY
Lyon & Lyon
ATTORNEYS

APPARATUS FOR APPLYING HEAT AND PRESSURE

This invention relates to apparatus for simultaneously applying heat and pressure to a work element. This invention will be described in connection with apparatus for making printed circuit laminates, but this is by way of illustration only.

In the manufacture of laminated printed circuit boards, it is common practice to apply heat and pressure simultaneously to the laminate. In conventional apparatus, considerable time is required in the production of these laminates because of the slow buildup of heat and pressure and because of the slow cooling of the apparatus parts, before the completed laminate can be withdrawn and an untreated one installed in place in the apparatus. It is the principal object of this invention to employ high energy infrared heaters which heat up very rapidly and to place those heaters within the interior of the pressure chamber, so that compressed air or compressed gas or other fluid used for applying pressure to the laminate can also be used for rapid cooling of the infrared heaters and the chamber walls, thereby making it possible to achieve the rapid on-off cycle. A wall of the pressure chamber, which receives radiant energy from the infrared heaters, is used to contact the laminate for the application of heat and pressure, and this wall may be relatively thin, so that rapid heating and cooling is achieved without storing of substantial quantities of heat.

Figure 1:
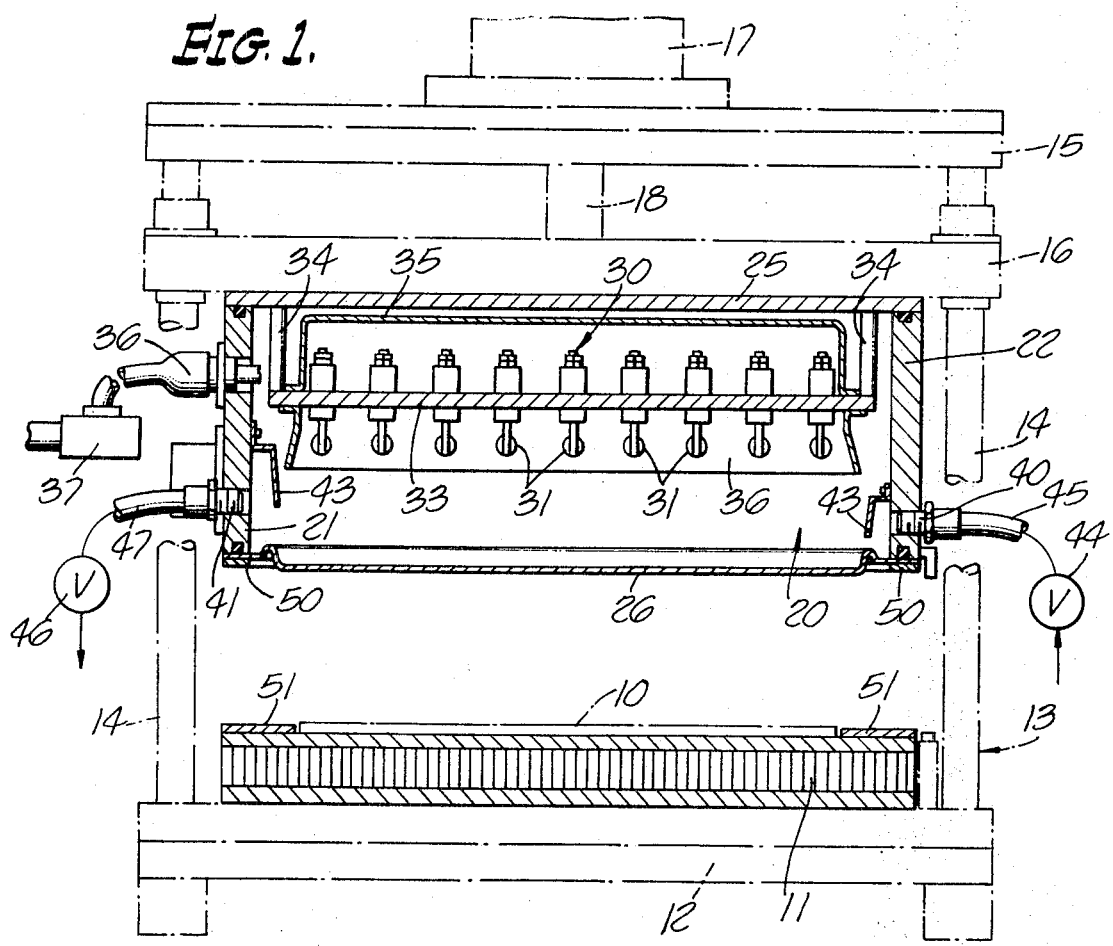
FIG. 1 is a sectional front elevation showing a preferred embodiment of this invention.

Referring to the drawings, the work member or laminate generally designated 10 rests on the upper surface of a stationary platen 11 carried on the stationary frame 12 of a press generally designated 13. This press may be of conventional construction, and as shown includes a plurality of stationary posts 14 connecting the upper frame member 15 to the lower member 12. A cross head member 16 is mounted to slide vertically on the post 14 under control of a hydraulic cylinder assembly 17 having a movable piston 18. Walls forming a pressure chamber 20 are mounted on the cross head member 16, and these walls comprise side walls 21, 22, 23, 24, the end wall 25 and the lower wall 26. The lower wall 26 comprises a flexible diaphragm fixed to the side walls 21—24 near the lower end thereof. When the cross head member 16 is lowered along the posts 14, the diaphragm 26 is brought into contact with the upper surface of the work element 10. This work element 10 may comprise a laminated printed circuit board.

High energy infrared heating means generally designated 30 are mounted within the interior of the pressure chamber 20 and are positioned to radiate heat against the diaphragm 26. The heating means 30 comprises a plurality of electrically energized infrared heaters 31 each comprising a quartz tube containing iodine and a tungsten filament. Infrared heating tubes of this type are commercially available. The heaters 31 are preferably mounted on a common platform 33 held in place within the pressure chamber 20 by means of the support brackets 34. A cover 35 forms the upper portion of the heating assembly 30, and a shield 36, open at the bottom, encircles the array of heating tubes 31. Electrical energy for each of the infrared heaters 31 is supplied through a pressure sealed insulator 36 fixed to the side wall 21. Suitable switch means 37 positioned exteriorly of the pressure chamber 20 is provided for energizing and de-energizing the infrared heaters 31.

An inlet connection 40 is provided in the side wall 22 for fluid under pressure such as, for example, air or an inert gas such as nitrogen or argon. An outlet connection 41 of similar construction is provided on the other side of the pressure chamber 20 in the wall 21. Baffles 42 and 43 mounted within the pressure chamber adjacent the inlet and outlet, respectively, serve as diffusers to minimize variations in fluid flow velocities within the pressure chamber as the pressure fluid passes from the inlet to the outlet. A valve 44 is provided in the inlet line 45, and similarly a valve 46 is provided in the outlet line 47.

In operation, the work element 10 is placed on the upper surface of the stationary platen 11, and the hydraulic cylinder assembly 17 of the press 13 is used to lower the cross head member 16 to bring the diaphragm 26 into surface contact with the work element 10, and to rest the blocks 50 on the lower ends of the side walls on the pads 51 carried on the platen 11. The valve 44 is then opened and the valve 46 closed in order to pressurize the interior of the chamber 20. The electrical switch 37 is closed to energize the bank of infrared heaters 31. These heaters develop a high temperature very rapidly and radiate a great amount of heat against the central flat portion of the diaphragm 26, and this heat is transmitted through the diaphragm directly to the work element 10. At the same time, fluid pressure within the chamber 20 acting on the diaphragm applies pressure to the work element 10. In a typical installation, the printed circuit board 10 may be subjected to a pressure of 200 pounds per square inch at a temperature of about 600°F for a time period of 30 seconds. The valve 46 is then opened to exhaust the fluid pressure in the chamber 20 while the cross head member 16 is being raised to lift the diaphragm 26 away from the work element 10. The flow of fluid under pressure from the inlet 40 to the outlet 41 serves to cool the diaphragm 26 as well as the infrared heaters 31 and the walls of the pressure chamber. When sufficient clearance has been developed, the laminated printed circuit board 10 is removed from the platen 11 and another untreated board is substituted in its place. The cycle is then repeated. The complete cycle may be accomplished in as little as 60 seconds.

Figure 3:
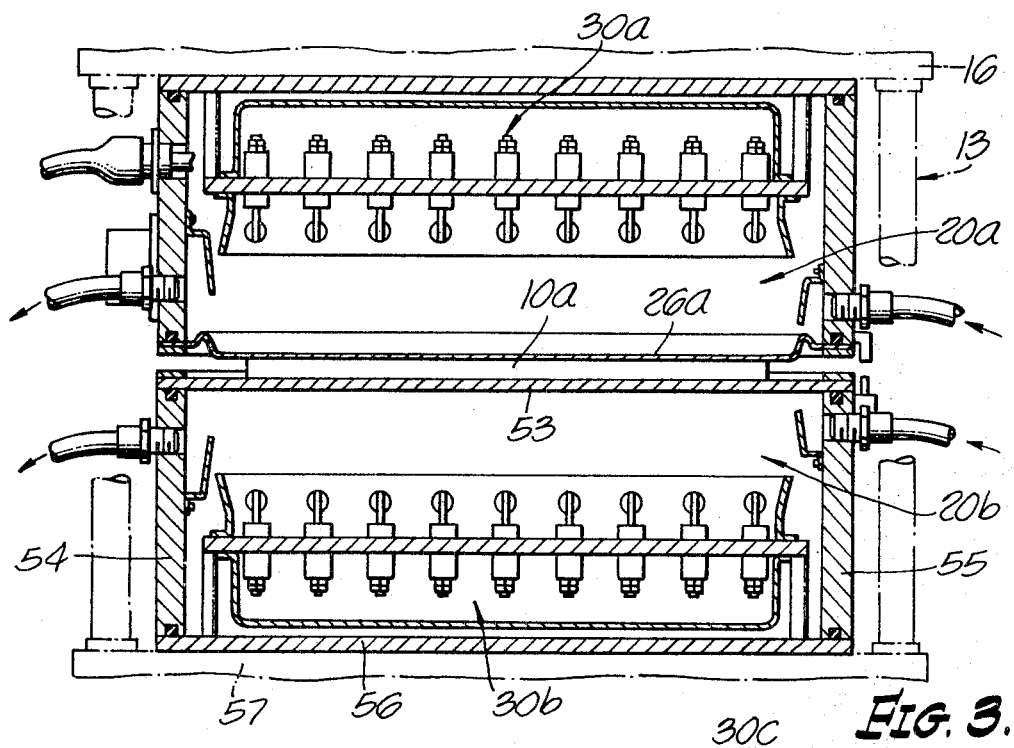
FIG. 3 is a sectional front elevation showing a modification.

In the modified form of the invention shown in FIG. 3, the infrared heating assembly 30a within the pressure chamber 20a is the same as that previously described. However, a duplicate infrared heating assembly 30b and pressure chamber 20b are provided below the stationary wall 53 which forms the upper boundary of the pressure chamber 20b. The other walls 54, 55 and 56 of the lower pressure chamber 20b are mounted on the stationary frame part 57 of the hydraulic press 13. The pressurizing and cooling of the upper and lower chambers 20a and 20b are each the same as previously described. In operation, the printed circuit laminate 10a is placed on the wall 53 and the cross head member 16 is lowered to bring the diaphragm 26a into contact with it. The pressure which builds up in the chamber 20a is matched by the pressure in the chamber 20b, so that the wall 53 is pressure-supported from its underside. This form of the invention has the advantage of applying heat to both the upper and lower surfaces of the laminate 10a.

Figure 2:
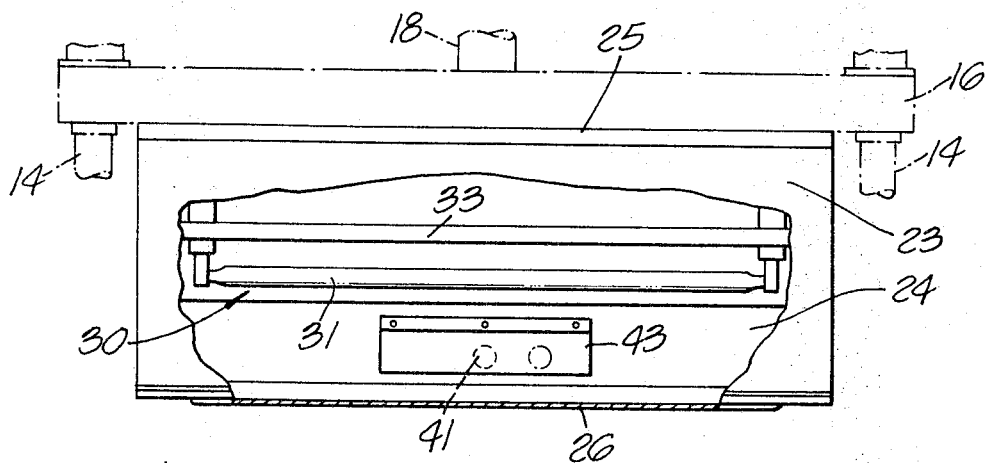
FIG. 2 is a side elevation of a portion of FIG. 1, partly broken away.
Figure 4:
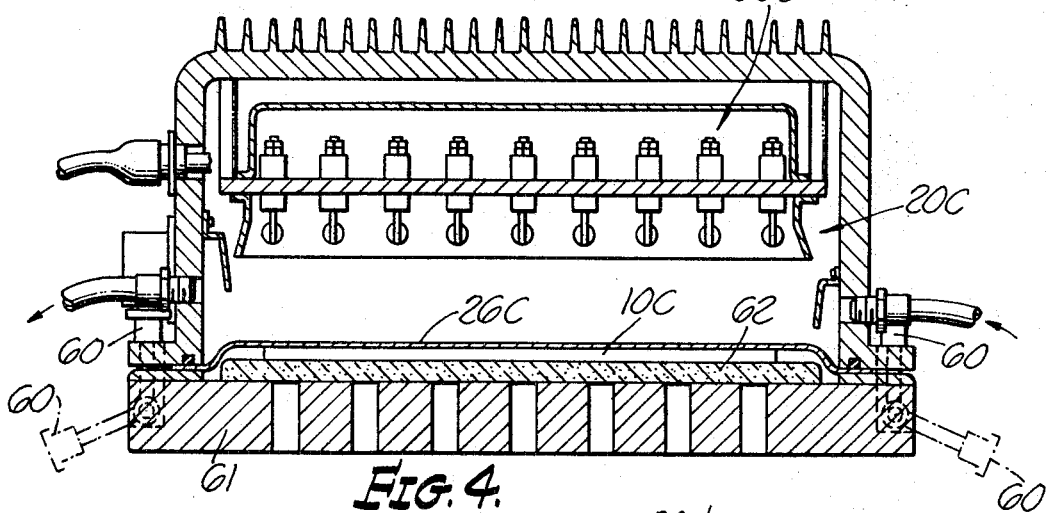
FIG. 4 is a sectional elevation showing a second modification.

In the modified form of the invention shown in FIG. 4, only one pressure chamber 20c is employed and only one infrared heater device 30c is used. In this respect, the device is similar to that shown in FIGS. 1 and 2. However, the walls of the pressure chamber 20c are not carried on a moving cross head of a press, but instead are connected by swing bolts 60 to a lower platen 61. The diaphragm 26c may comprise a loose piece rested on the upper surface of the printed circuit laminate 10c, which in turn rests on the porous plate 62. Selected swing bolts 60 may be disconnected and moved to an inoperative position as shown by the phantom lines, in order to separate the platen 61 from the walls of the chamber 23, and the members may thus be swung in a pivotal motion about the remaining swing bolts in order to provide clearance to withdraw the treated work element and to insert an untreated one. Alternatively, all of the swing bolts may be moved to an inoperative position to permit the platen 61 to be moved relative to the walls of the pressure chamber 20c in a direction at right angles to the flat surface of the printed circuit laminate 10c. In other respects, the operation of this form of the invention is the same as that described in connection with FIGS. 1 and 2.

Figure 5:
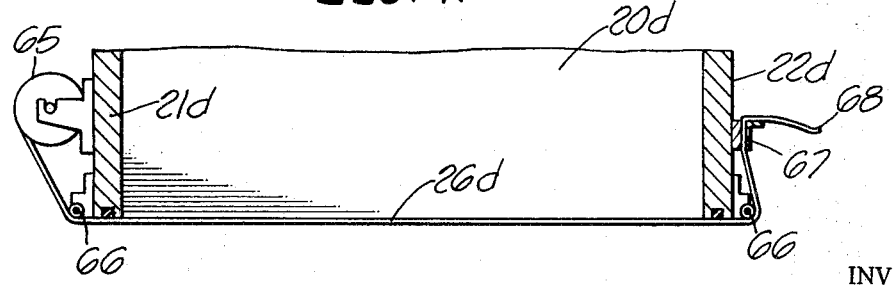
FIG. 5 is a sectional front elevation, partly broken away, showing a modified form of diaphragm mounting which may be employed with any of the forms of the invention illustrated.

The modification of FIG. 5 shows a device for use with any of the pressure chambers described above, and wherein the flexible diaphragm 26d is formed as a part of a strip contained in a coil 65 and passing over rollers 66 mounted at one end of the walls 21d and 22d which form part of the pressure chamber 20d. When a section of the diaphragm strip becomes worn or unserviceable after a period of use, an additional length of strip is drawn into position and secured by the clip 67, the worn portion of the diaphragm being cut away at 68 and discarded. This form of diaphragm mounting may be used in connection with any of the forms of the invention previously described.

Water cooling of the walls of the chambers may be employed as desired but has been omitted from the drawings for clarity of illustration.

Having fully described my invention, it is to be understood that I am not to be limited to the details herein set forth but that my invention is of the full scope of the appended claims.

I claim:

1. Apparatus for applying heat and pressure simultaneously to a work element in a rapid on-off cycle, comprising, in combination: a pair of members mounted for relative movement and adapted to receive the work element between them, at least one of the members having walls defining a pressure chamber, one wall of the pressure chamber being adapted to transmit heat and pressure to the work element, electrically energized infrared heating means located within said pressure chamber and positioned to radiate heat against the latter said wall, means for admitting pressure fluid into said chamber and discharging it therefrom, and selectively operable means for actuating said infrared heating means and for controlling the intensity of fluid pressure in said chamber.

2. The combination of claim 1 in which the said members are mounted for movement toward and away from the work element.

3. The combination of claim 1 in which the wall which transmits pressure and heat is substantially flat, and wherein the members are mounted for movement at right angles to said wall.

4. The combination of claim 1 in which the members are hingedly connected for pivotal movement.

5. The combination of claim 1 in which the wall which transmits pressure and heat comprises a flexible diaphragm.

6. Apparatus for applying heat and pressure simultaneously to a work element in a rapid on-off cycle, comprising, in combination: a pair of members adapted to receive the work element between them, at least one of the members having walls defining a pressure chamber, one wall of the pressure chamber comprising a flexible diaphragm adapted to transmit heat and pressure to the work element, selectively operable electrically energized infrared heating means located within said pressure chamber and positioned to radiate heat against said diaphragm, and selectively operable means for admitting pressure fluid into said chamber and discharging it therefrom.

7. The combination of claim 6 in which the flexible diaphragm has a central portion which is substantially flat.

8. The combination of claim 7 in which the members are mounted for relative movement in a direction at right angles to the central portion of said diaphragm.

9. The combination of claim 6 in which the members are hinged together for pivotal movement.

10. The combination of claim 6 in which the flexible diaphragm is provided by a roll of flexible material mounted on one of the members and having a portion extending from the roll to form a wall of the pressure chamber.

11. Apparatus for applying heat and pressure simultaneously to a work element in a rapid on-off cycle, comprising, in combination: a pair of members mounted for relative movement and adapted to receive the work element between them, at least one of the members having walls defining a pressure chamber, one wall of the pressure chamber comprising a flexible diaphragm adapted to transmit heat and pressure to the work element, selectively operable electrically energized infrared heating means located within said pressure chamber and positioned to radiate heat against said diaphragm, a pressure fluid inlet on one side of the pressure chamber, a pressure fluid outlet on the opposite side of the pressure chamber, whereby a flow of pressure fluid may occur across the chamber for cooling, and selectively operable means for restricting flow through said outlet to build up pressure in said pressure chamber.

12. The combination of claim 11 in which fluid diffuser means are provided within the pressure chamber adjacent the inlet and adjacent the outlet to minimize variations in fluid flow velocities within the pressure chamber.

13. Apparatus for applying heat and pressure simultaneously to a flat work element in a rapid on-off cycle, comprising, in combination: a pair of members mounted for relative vertical movement and adapted to receive the flat work element between them, each of the members having walls defining a pressure chamber on each member, one wall of each chamber being adapted to transmit heat and pressure to the work element, one of said pressure transmitting walls comprising a flexible diaphragm, selectively operable electrically energized infrared heating means positioned within each of said pressure chambers and positioned to radiate heat against one of said pressure transmitting walls, respectively, means for admitting pressure fluid into each of said chambers and discharging it therefrom, and selectively operable means for controlling the intensity of fluid pressure in said chambers.